United States Patent [19]

Anestos

[11] 4,241,357
[45] Dec. 23, 1980

[54] METHOD AND APPARATUS FOR OPERATING AN INK JET

[75] Inventor: Themos C. Anestos, Utica, Mich.

[73] Assignee: Exxon Research & Engineering Co., Florham Park, N.J.

[21] Appl. No.: 78,131

[22] Filed: Sep. 24, 1979

[51] Int. Cl.³ .......................................... G01D 15/18
[52] U.S. Cl. ............................... 346/140 R; 346/1.1
[58] Field of Search ..................... 346/75, 1, 140 R

[56] References Cited

U.S. PATENT DOCUMENTS

| | | | |
|---|---|---|---|
| 3,810,194 | 5/1974 | Tekunaga et al. | 346/75 |
| 3,893,126 | 7/1975 | Ascoli et al. | 346/75 X |
| 4,050,078 | 9/1977 | Isayama et al. | 346/140 R |
| 4,112,435 | 9/1978 | Kattner et al. | 346/140 R |
| 4,166,277 | 8/1979 | Cielo et al. | 346/140 R |

Primary Examiner—George H. Miller, Jr.
Attorney, Agent, or Firm—Norman L. Norris

[57] ABSTRACT

An ink jet is supplied with ink from an ink reservoir. The impedance changes resulting from the presence or absence of the ink at the orifice of the ink jet are sensed to determine if the ink jet is primed and/or purged and ready for operation.

12 Claims, 3 Drawing Figures

METHOD AND APPARATUS FOR OPERATING AN INK JET

BACKGROUND OF THE INVENTION

This invention relates to the operation of an ink jet of the type utilized in printing, and more particularly, to determine when the ink is present at the orifice of an ink jet.

Ink jets of various kinds including impulse jets require, from time-to-time, the priming and/or purging of the ink jet. During priming, ink is supplied to the ink jet to ready the ink jet for printing. During such priming, the ink jet is filled with ink until ink emerges at the orifice of the ink jet. Similarly, during purging of the ink jet, ink is supplied to the jet until ink emerges from the orifice.

In certain instances, particularly after priming with an impulse ink jet, it is desirable to know when the ink jet has been fully primed; i.e., when ink first appears at the orifice of the ink jet so that priming may be discontinued on a timely basis before any ink is spilled from the orifice. In addition, it is desirable to discontinue priming on a timely basis so as to avoid the accumulation of a large amount of ink at the orifice which could, upon initiation of the ink jet, create a blotch on the printing medium.

Prior art efforts have been made to control the quantity of ink utilized in priming and thereby prevent the spillage and/or undesirable accumulation of ink at the orifice of an ink jet. For example, U.S. Pat. No. 2,997,180 to Zenner discloses an automatic priming device for an ink jet printer comprising a bladder of predetermined size which is filled with ink which is used during priming to supply ink to the ink jet orifice. However, as Zenner indicates, the size of the bladder must be carefully controlled to assure the proper amount of ink which will vary as a function of the capacity of the ink reservoir, the ink jet, and the connections between the ink reservoir and the ink jet.

SUMMARY OF THE INVENTION

It is an object of this invention to determine when ink first emerges from the orifice of an ink jet prior to the time that any substantial quantity of ink is spilled or ejected from the orifice.

It is a more specific object of this invention to make such a determination during the priming and/or purging of an ink jet.

It is a further object of this invention to make such a determination and control the priming and/or purging of an ink jet in response to the determination.

In accordance with these and other objects of the invention, a preferred embodiment of the invention comprises an ink jet for issuing droplets therefrom and means for supplying ink from the reservoir to the ink jet. Impedance sensing means associated with the orifice senses changes in impedance resulting from the presence or absence of a quantity of ink at the orifice.

In the preferred embodiment of the invention, an element is positioned sufficiently close to the orifice to permit an ink droplet to simultaneously contact the orifice and the element and impedance sensing means is electrically connected to the element so as to sense a change in impedance between the orifice and the element represented by the presence or absence of ink. Preferably, the element comprises a conductive material and includes an opening juxtaposed to the orifice of the ink jet so as to permit droplets issuing from the orifice to pass through the opening. The element is sufficiently close to the orifice so that the accumulating ink at the orifice will contact the conductive element before an undesirably large quantity of ink collects at the orifice.

In accordance with one important aspect of the invention, supply means includes priming means and/or purging means adapted to assure that the ink jet is adequately supplied with ink prior to activating the ink jet.

In accordance with still another important aspect of the invention, the priming and/or purging means is coupled to the impedance sensing means so as to control the priming and/or purging and interrupt priming or purging when the impedance senses the presence of ink at the orifice.

In order to control the amount of ink which accumulates at the ink jet orifice, it is important to carefully maintain the distance between the conductive element and the ink jet orifice as it relates to the size of the ink jet orifice. It is also desirable to control the size of the opening in the conductive element relative to the size of the orifice and the space between the conductive element and the orifice.

DETAILED DESCRIPTION OF A PREFERRED EMBODIMENT

Figure 1:
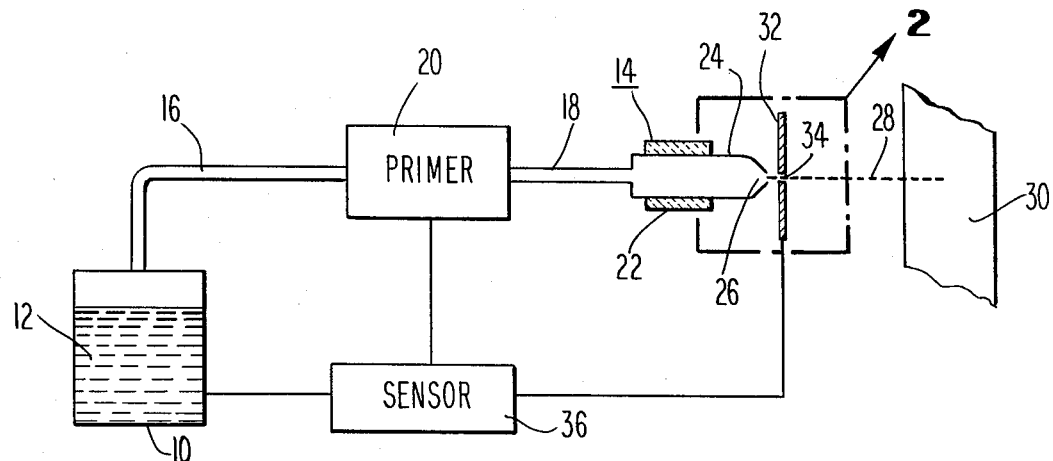
FIG. 1 is a schematic/block diagram representing a preferred embodiment of the invention.

Referring to FIG. 1, an ink reservoir 10 contains ink 12 which is supplied to an ink jet 14. The means for supplying ink to the ink jet 14 includes hoses 16 and 18 and a priming/purging apparatus 20. The ink jet 14 which is of the impulse type comprises a transducer 22 surrounding a cylindrical tube 24 having an orifice 26 at one end thereof for expelling a stream of ink droplets 28 toward a print receiving medium 30.

In accordance with this invention, a conductive element 32 having an opening 34 therein juxtaposed to the orifice 26 in the ink jet 14. The conductive element 32 in combination with an impedance sensor 36 is capable of determining when an appropriate quantity of ink has accumulated at the orifice 26 as a result of priming by the primer/purger 20. When such an appropriate quantity of ink has accumulated, the sensor 36 signals the primer/purger 20 and priming or purging is discontinued so as to permit the ink jet 14 to be activated to produce the stream of droplets 28 shown in FIG. 1.

Figure 2:
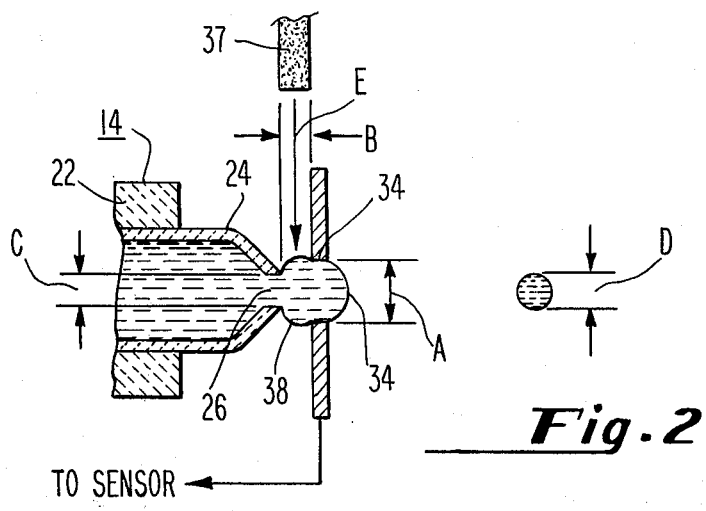
FIG. 2 is an enlarged view of the area 2 shown in FIG. 1.

Reference will now be made to FIG. 2 for a better understanding of the spacial relationships between the ink jet 14 and the conductive element 32. Three different dimensions are defined in FIG. 2. A first dimension A represents the minimum cross-sectional dimension of the opening 34 in the conductive element 32 which in the case of the circular opening would of course be the diameter. The dimension B represents the distance between the orifice 26 and the conductive element 32. This measurement is made between the forward-most portion of the tubular member 24 which defines the orifice and the rear-most portion of the conductive element 32 at the opening 34. A third dimension C represents the maximum cross-sectional dimension of the orifice 26 which is of course the diameter assuring a circular orifice. A fourth dimension, not shown in the figure, is the maximum cross-sectional dimension or diameter D of a drop of the ink being used which can remain attached to the cylindrical tube 24 at its orifice 26 without breaking free under gravitational force and/or under the inertial forces to which the jet is exposed; D is referred to as the macrodrop diameter.

In the preferred embodiment, A should be larger than the diameter of the ink droplets emitted by the jet (which in turn is not more than 2C in most cases) and less than D; preferably, A is the larger of 2C and D/2. The dimension B may also be taken in the range 2C to D, with preference given to B being the larger of 2C and D/2.

By utilizing dimensions A and B in the above-mentioned ranges relative to C and D, it is possible to control the quantity of ink 38 which accumulates at the orifice 26 with sufficient precision to assure, for example, full and complete priming of the ink jet 14 while at the same time avoiding any spillage or excessive accumulation which could create undesirable marks at the time of initiating operation of the ink jet 14.

A movable wiping element 37 which is moved toward the orifice 26 as indicated by arrow E by, for example, a solenoid, not shown, may be used to remove the ink 38 prior to printing. Other means of removing the ink 38 may also be utilized.

Figure 3:
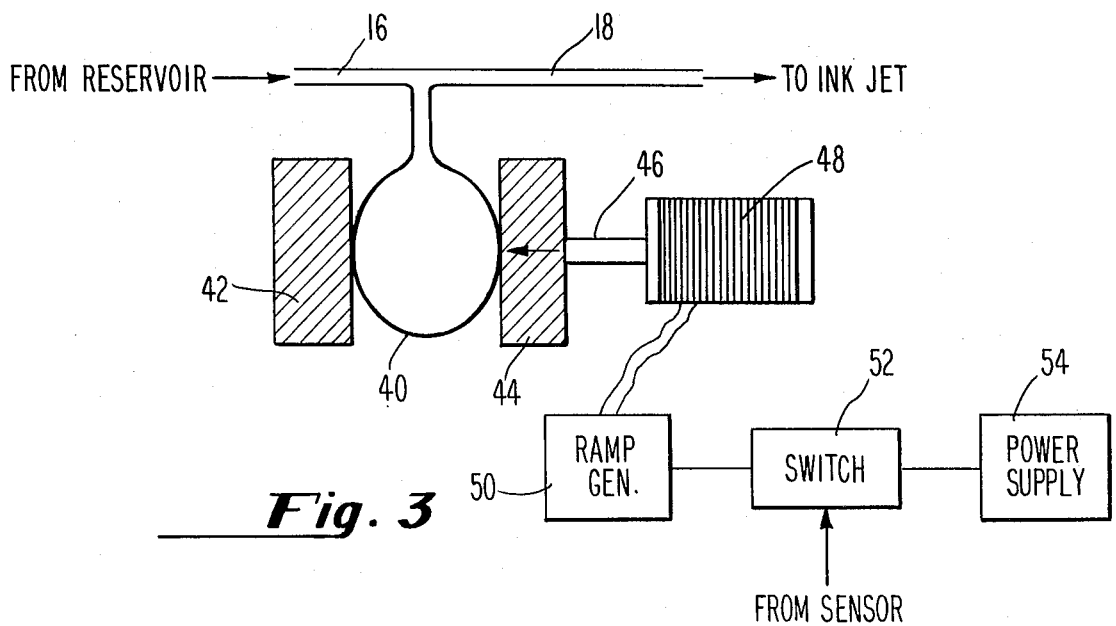
FIG. 3 schematic/block diagram of the priming mechanism shown in block form in FIG. 1.

Reference will now be made to FIG. 3 for an example of a primer 20 which may be controlled in response to the sensor 36, shown in FIG. 3, the primer 20 comprises a bladder 40 which is coupled to a junction between hoses 16 and 18. The bladder 40 is designed to hold a predetermined quantity of ink 40 which is more than adequate to fully prime or purge the ink jet 14 under all circumstances. Bladder 40 is located between an anvil 42 and a piston 44 attached to a plunger 46 of a solenoid 48. The solenoid 48 is supplied by a generator 50 which produces a ramp-like voltage when the switch 52 is closed to a power supply 54. When a predetermined quantity of ink is sensed by the sensor 36, power from the power supply is interrupted by the switch 52 and the ramp-like voltage is terminated.

Although a specific primer arrangement has been shown and described with respect to FIG. 3, it is not intended to limit the invention to such an arrangement. It will be understood by those skilled in the art that a variety of priming arrangements could be utilized to provide the function of supplying ink from the reservoir to the ink jet. It should also be understood that the invention is not limited to an impulse type ink jet. For example, it is equally applicable to a continuous stream ink jet. Furthermore, although a preferred embodiment utilizing sensing by means of a change in impedance of a resistive type has been described, it is not intended to limit the invention to resistive type sensing. In particular, sensing of the type required may also be accomplished by monitoring a change in capacitive impedance using an element similar to that shown as 32 in FIGS. 1 and 2. In the capacitive sensing case, the capacitance between the ink surface and the element 32 desribes the position of the ink meniscus; since the capacitance changes continuously with meniscus position relative to element 32, priming can then be usefully halted when the meniscus is short of contact with element 32. The capacitance between the ink surface and the element 32 may be determined using circuitry disclosed in U.S. Pat. Nos. 3,706,980 and 3,781,672, incorporated herein by reference.

Although a particular embodiment has been shown and described various modifications will occur to those of ordinary skill in the art which are with the true spirit and scope of the invention as set forth in the appended claims.

I claim:

1. Ink jet apparatus comprising:
   an ink reservoir;
   an ink jet including an orifice issuing ink droplets therefrom;
   means for supplying ink from said reservoir to said ink jet; and
   impedance sensing means associated with said orifice for sensing changes in impedance resulting from the presence or absence of ink droplets accumulating at said orifice.

2. The apparatus of claim 1 wherein said supplying means comprises means for priming said ink jet.

3. The apparatus of claim 3 wherein said priming means is coupled to said sensor means and controlled in response thereto.

4. The apparatus of claim 1 further comprising an element located adjacent to said orifice, said element being positioned sufficiently close to said orifice so as to permit an ink droplet to simultaneously contact said orifice and said element, said impedance sensing means being electrically coupled to said element.

5. The apparatus of claim 4 wherein said element comprises a conductive material.

6. The apparatus of claim 5 wherein said element has an opening therein juxaposed to said orifice so as to permit droplets issuing from said orifice to pass through said opening.

7. The apparatus of claim 6 wherein the minimum cross-sectional dimension of said opening is greater than the maximum cross-sectional dimension of a droplet and said orifice.

8. The apparatus of claim 6 wherein the distance between said conductive element and said orifice is greater than twice the maximum cross-sectional dimension of said orifice and half the maximum cross-sectional dimension of a droplet.

9. A method of operating an ink jet having an orifice comprising:
   supplying ink to an ink jet;
   accumulating a quantity of ink at the orifice of said ink jet;
   sensing a change in the impedance at the orifice in response to the presence or absence of said accumulated quantity of ink.

10. The method of claim 9 including the step of ejecting droplets of ink from said orifice after sensing the change in the impedance.

11. The method of claim 9 wherein said step of supplying comprises priming said ink jet.

12. The method of claim 11 including the step of terminating priming in response to sensing of said predetermined quantity.

* * * * *